(12) United States Patent
Bhattar

(10) Patent No.: US 12,374,870 B2
(45) Date of Patent: Jul. 29, 2025

(54) ELECTRICAL PANEL BOARD

(71) Applicant: ABB Schweiz AG, Baden (CH)

(72) Inventor: Kiran Bhattar, Hyderabad (IN)

(73) Assignee: ABB Schweiz AG, Baden (CH)

( * ) Notice: Subject to any disclaimer, the term of this patent is extended or adjusted under 35 U.S.C. 154(b) by 71 days.

(21) Appl. No.: 18/178,654

(22) Filed: Mar. 6, 2023

(65) Prior Publication Data
US 2023/0283051 A1 Sep. 7, 2023

(30) Foreign Application Priority Data

Mar. 7, 2022 (IN) .............................. 202241012051

(51) Int. Cl.
H02B 1/04 (2006.01)
H02B 1/14 (2006.01)
H02H 3/16 (2006.01)

(52) U.S. Cl.
CPC .................. *H02B 1/04* (2013.01); *H02B 1/14* (2013.01); *H02H 3/16* (2013.01)

(58) Field of Classification Search
CPC . H02B 1/04; H02B 1/056; H02B 1/14; H02B 1/16; H02B 1/42; H02H 3/16
See application file for complete search history.

(56) References Cited

U.S. PATENT DOCUMENTS

| | | | |
|---|---|---|---|
| 3,745,415 A | 7/1973 | Polley et al. | |
| 4,281,359 A * | 7/1981 | Bayer | H02B 11/26 361/115 |
| 4,300,110 A * | 11/1981 | Bayer | H01H 71/7409 200/50.28 |
| 4,783,718 A * | 11/1988 | Raabe | H02B 1/056 361/652 |
| 5,142,646 A * | 8/1992 | Nachtigall | H02H 3/16 361/50 |
| 5,825,598 A | 10/1998 | Dickens et al. | |
| 6,570,754 B2 * | 5/2003 | Foley | H02B 1/056 361/652 |
| 6,920,038 B2 * | 7/2005 | Gehlbach | H02B 1/056 361/822 |

(Continued)

OTHER PUBLICATIONS

Canadian Intellectual Property Office, Office Action in Canadian Patent Application No. 3,191,953, 6 pp. (Jul. 23, 2024).

(Continued)

*Primary Examiner* — Robert J Hoffberg

(74) *Attorney, Agent, or Firm* — Leydig, Voit & Mayer, Ltd.

(57) ABSTRACT

An electrical panel board includes an enclosure defining a first and second chamber, a power distribution module disposed in one of the first chamber and the second chamber and adapted to electrically connect a main power source to receive power thereof with one or more loads. A neutral assembly is positioned in the remaining of the first chamber and the second chamber and securable to the rear wall of the enclosure. The neutral assembly includes a neutral circuit and a ground fault protection unit electrically coupled to each other. The neutral assembly having the neutral circuit and the ground fault protection unit extends from the rear wall to an imaginary plane which is off set rearwardly from an imaginary plane along which the power distribution module extends from the rear wall.

14 Claims, 7 Drawing Sheets

(56) References Cited

U.S. PATENT DOCUMENTS

| | | | | |
|---|---|---|---|---|
| 7,209,343 | B2* | 4/2007 | Remmert | H02B 1/056 |
| | | | | 361/652 |
| 7,245,480 | B2* | 7/2007 | Dixon | H02B 1/056 |
| | | | | 200/293 |
| 7,295,427 | B2* | 11/2007 | Muhlberger | H02B 1/056 |
| | | | | 200/295 |
| 7,449,645 | B1* | 11/2008 | Flegel | H01R 4/64 |
| | | | | 439/723 |
| 8,305,739 | B2* | 11/2012 | Dozier | H02B 1/32 |
| | | | | 361/627 |
| 8,929,055 | B2* | 1/2015 | Potratz | H02B 1/056 |
| | | | | 174/68.2 |
| 8,953,306 | B2* | 2/2015 | Wheeler | H02B 1/20 |
| | | | | 174/68.2 |
| 9,548,548 | B2* | 1/2017 | Potratz | H01R 9/2458 |
| 10,218,159 | B2* | 2/2019 | Rehmer | H02B 1/21 |
| 10,951,027 | B2* | 3/2021 | Thornton | H02J 3/00 |
| 11,942,266 | B1* | 3/2024 | Thies | H01F 38/30 |
| 2012/0162862 | A1 | 6/2012 | Cosley et al. | |
| 2018/0366940 | A1 | 12/2018 | Violo et al. | |

OTHER PUBLICATIONS

Intellectual Property India, First Examination Report in Indian Patent Application No. 202241012051, 5 pp. (May 15, 2025).

\* cited by examiner

ELECTRICAL PANEL BOARD

CROSS-REFERENCE TO RELATED APPLICATIONS

This patent application claims priority to Indian Patent Application No. 202241012051, filed on Mar. 7, 2022, which is incorporated herein in its entirety by reference.

FIELD OF THE DISCLOSURE

The present disclosure relates in general to an electrical distribution equipment and, more particularly, to a ground fault protection circuit for an electrical panel board.

BACKGROUND OF THE INVENTION

An electrical distribution system within an industrial, commercial, or residential property starts at the utility service entrance and ends at the final utilization equipment or loads. The service entrance includes the utility company's wattmeter or kWh meter. Beyond the utility company's meter is a main circuit interrupting device, such as a circuit breaker. The main circuit breaker supplies power to several feeder circuits which in turn power a number of branch circuits. In a small system, such as a system used for residential application, the main circuits directly feed individual branch circuits and no feeder circuits are employed. The electrical utilization loads are normally located on the branch circuits. Such electrical distribution systems include ground fault protection ("GFP") circuits that are commonly used for providing automatic circuit interruption upon detection of undesired short circuit currents which flow because of a ground fault condition in electrical power distribution systems.

Such ground fault protection circuits generally include means for quickly sensing and individually isolating any faults occurring in a respective branch circuit of the power distribution systems and utilize selective coordination to instantly respond and interrupt power only to the system area where a fault occurs thereby preventing unnecessary loss of power to other areas. Conventionally, such ground fault protection circuits are provided external to the distribution system such as electrical panel board. Providing such ground fault protection circuits external to the system requires additional space and incurs additional costs, and adding to the complexity of the system.

The present disclosure is directed to overcome one or more limitations stated above.

BRIEF SUMMARY OF THE INVENTION

One or more shortcomings of conventional systems are overcome, and additional advantages are provided through the assembly and the system as claimed in the present disclosure. Additional features and advantages are realized through the techniques of the present disclosure. Other embodiments and aspects of the disclosure are described in detail herein and are considered a part of the claimed disclosure.

In a non-limiting embodiment of the disclosure, an electrical panel board is described. The electrical panel board includes an enclosure comprising a rear wall, side wall structure projecting perpendicular to and forwardly from a periphery of the rear wall defining a front opening through which an interior of the enclosure is accessible. The interior of the enclosure defines a first chamber and a second chamber. The panel board further includes a power distribution module disposed in one of the first chamber and the second chamber and is securable to the rear wall of the enclosure. The power distribution module is adapted to electrically connect a main power source to receive power thereof with one or more loads. A neutral assembly is positioned in the remaining of the first chamber and the second chamber and securable to the rear wall of the enclosure. The neutral assembly includes a neutral circuit and a ground fault protection unit. The neutral circuit comprising a plurality of neutral input lugs arranged for connection of a neutral line with some of the one or more loads. The ground fault protection unit is electrically coupled to the neutral circuit and is adapted to electrically couple the neutral circuit with remaining of the one or more loads. The neutral assembly having the neutral circuit and the ground fault protection unit extends from the rear wall to an imaginary plane which is off set rearwardly from an imaginary plane along which the power distribution module extends from the rear wall.

In an embodiment of the present disclosure, the power distribution module includes at least one of a bus bar compartment having at least one bus bar, a cable compartment for routing cables and a circuit breaker compartment having a one or more circuit breakers.

In an embodiment of the present disclosure, the offset between the imaginary plane and the imaginary plane of the neutral assembly and the imaginary plane of the power distribution module defines a gutter space in the enclosure for routing cables.

In an embodiment of the present disclosure, a barrier member provided between the first chamber and the second chamber. The barrier member is structured to isolate cables extending from the first chamber to come into contact with the second chamber. The barrier member is provided on either ends of the ground fault protection unit.

In an embodiment of the present disclosure, the ground fault protection unit is electrically coupled to the neutral circuit by a bridge connector. The bridge connector is made of an electrically conductive material.

In an embodiment of the present disclosure, the first chamber and the second chamber are defined one below the other.

In an embodiment of the present disclosure, the ground fault protection unit includes a base plate connectable to and extending forwardly from the rear wall of the enclosure. At least one insulating member is securable to the base plate on either ends on a front side of the base plate. Further, a connector plate is secured to the base plate through the at least one insulating member. The connector plate is defined with a plurality of apertures. A supporting bracket is positioned adjacent to the connector plate and is securable to the base plate. One or more current sensors is securable to the connector plate and supported by the supporting bracket.

In an embodiment of the present disclosure, the at least one insulating member is configured to isolate the base plate from the connector plate. The connector plate is made of an electrically conductive material. Further, the plurality of apertures is defined equidistantly on the connector plate.

In an embodiment of the present disclosure, each of the one or more current sensors comprises a securing tab. The securing tab is positioned corresponding to respective aperture of the plurality of apertures and securable to the connector plate through securing members. The securing bracket is defined with a plurality of tabs and each of the plurality of tabs is structured to arrest the movement of at least one current sensor of the one or more current sensors.

In an embodiment of the present disclosure, the panel board includes an insulating plate disposed between the sidewall of the enclosure and the ground fault protection unit. The insulating plate is structured to isolate the enclosure from the ground fault protection unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE SEVERAL VIEWS OF THE DRAWING(S)

DETAILED DESCRIPTION OF THE INVENTION

Figure 1:
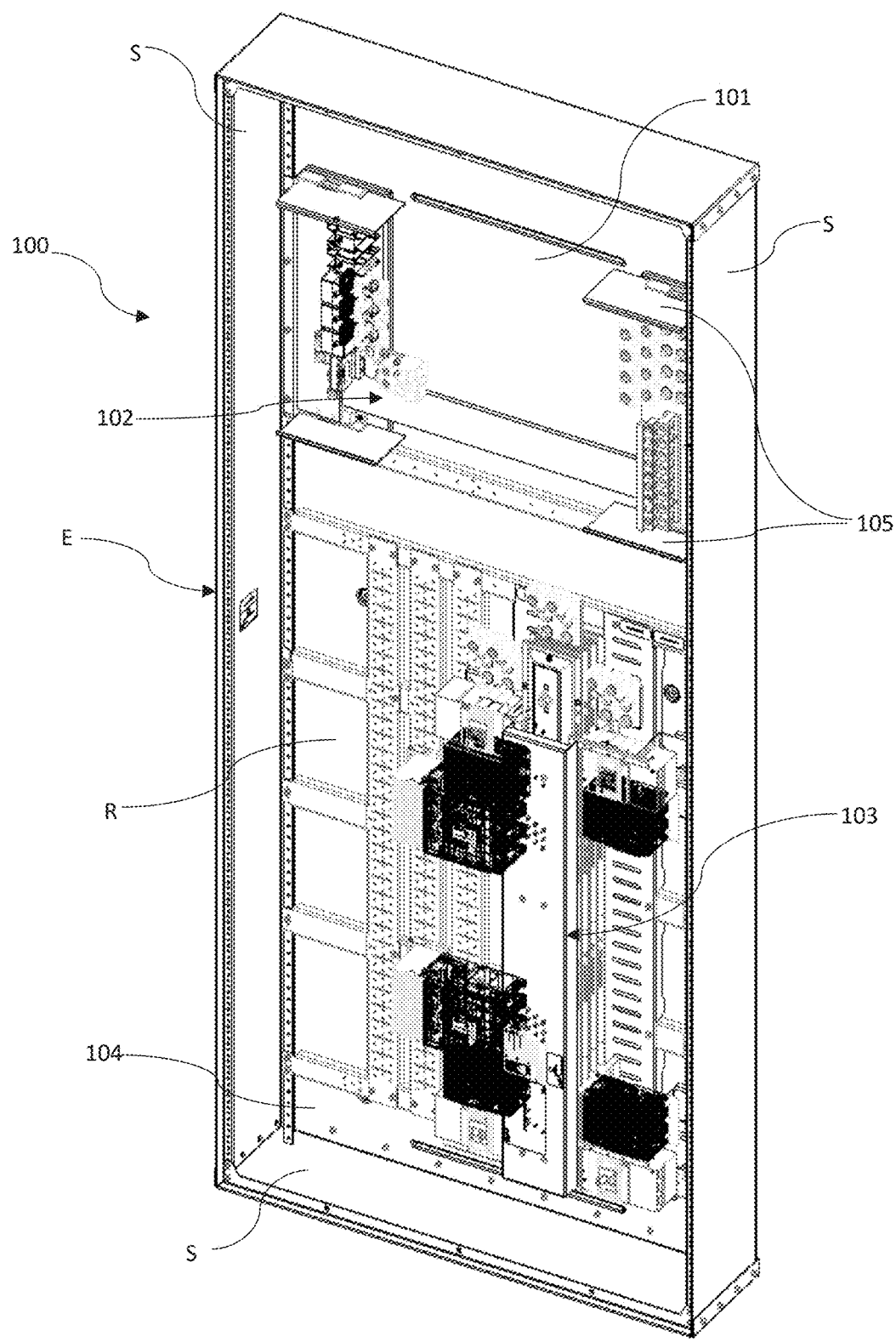
FIG. 1 illustrates a perspective view of an electrical panel board, in accordance with an embodiment of the disclosure.

The foregoing has broadly outlined the features and technical advantages of the present disclosure in order that the description of the disclosure that follows may be better understood. Additional features and advantages of the disclosure will be described hereinafter which form the subject of the disclosure. It should be appreciated by those skilled in the art that the conception and specific embodiments disclosed may be readily utilized as a basis for modifying or designing other system for carrying out the same purposes of the present disclosure. It should also be realized by those skilled in the art that such equivalent constructions do not depart from the scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

While the disclosure is susceptible to various modifications and alternative forms, specific embodiments thereof have been shown by way of example in the drawings and will be described below. It should be understood, however that it is not intended to limit the disclosure to the particular forms disclosed, but on the contrary, the disclosure is to cover all modifications, equivalents, and alternatives falling within the scope of the disclosure.

The terms "comprises," "comprising," or any other variations thereof used in the disclosure, are intended to cover a non-exclusive inclusions, such that an assembly comprises a list of components does not include only those components but may include other components not expressly listed or inherent to such assemblies. In other words, one or more elements in assemblies proceeded by "comprises" does not, without more constraints, preclude the existence of other elements or additional elements in the system or device.

The following paragraphs describe the present disclosure with reference to FIGS. 1 to 6b. In the figures, the same element or elements which have similar functions are indicated by the same reference signs. For the purposes of promoting an understanding of the principles of the disclosure, reference will now be made to specific embodiments illustrated in the drawings and specific language will be used to describe the same. It will nevertheless be understood that no limitation of the scope of the invention is thereby intended, such alterations and further modifications in the illustrated methods, and such further applications of the principles of the invention as illustrated therein being contemplated as would normally occur to one skilled in the art to which the invention pertains.

The following detailed description is merely exemplary in nature and is not intended to limit application and uses. Further, there is no intention to be bound by any theory presented in the preceding background or summary or the following detailed description. It is to be understood that the disclosure may assume various alternative orientations and step sequences, except where expressly specified to the contrary. It is also to be understood that the specific devices or components illustrated in the attached drawings and described in the following specification are simply exemplary embodiments of the inventive concepts defined in the appended claims. Hereinafter, preferred embodiments of the present disclosure will be described referring to the accompanying drawings. While some specific terms directed to a specific direction will be used, the purpose of usage of these terms or words is merely to facilitate understanding of the present invention referring to the drawings.

Accordingly, it should be noted that meaning of these terms or words should not improperly limit the technical scope of the present invention. Also, it is to be understood that the phraseology and terminology used herein is for the purpose of description and should not be regarded as limiting. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that this disclosure is not limited to the specific devices, methods, applications, conditions, or parameters described and/or shown herein, and that the terminology used herein is for the purpose of describing particular embodiments by way of example and is not intended to be limiting of the claimed invention. In the present document, the word "exemplary" is used herein to mean "serving as an example, instance, or illustration." Any embodiment or implementation of the present subject matter described herein as "exemplary" is not necessarily to be construed as preferred or advantageous over other embodiments. Hereinafter, preferred embodiments of the present disclosure will be descried referring to the accompanying drawings. While some specific terms of "front/forward", "rear/rearward/back/backward", "up/upper/top", "down/lower/lower ward/downward, bottom", "left/leftward", "right/rightward", "forwardly/forward", "perpendicularly" and other terms containing these specific terms and directed to a specific direction will be used, the purpose of usage of these terms or words is merely to facilitate understanding of the present invention referring to the drawings. Accordingly, it should be noted that the meanings of these terms or words should not improperly limit the technical scope of the present disclosure.

Figure 2:
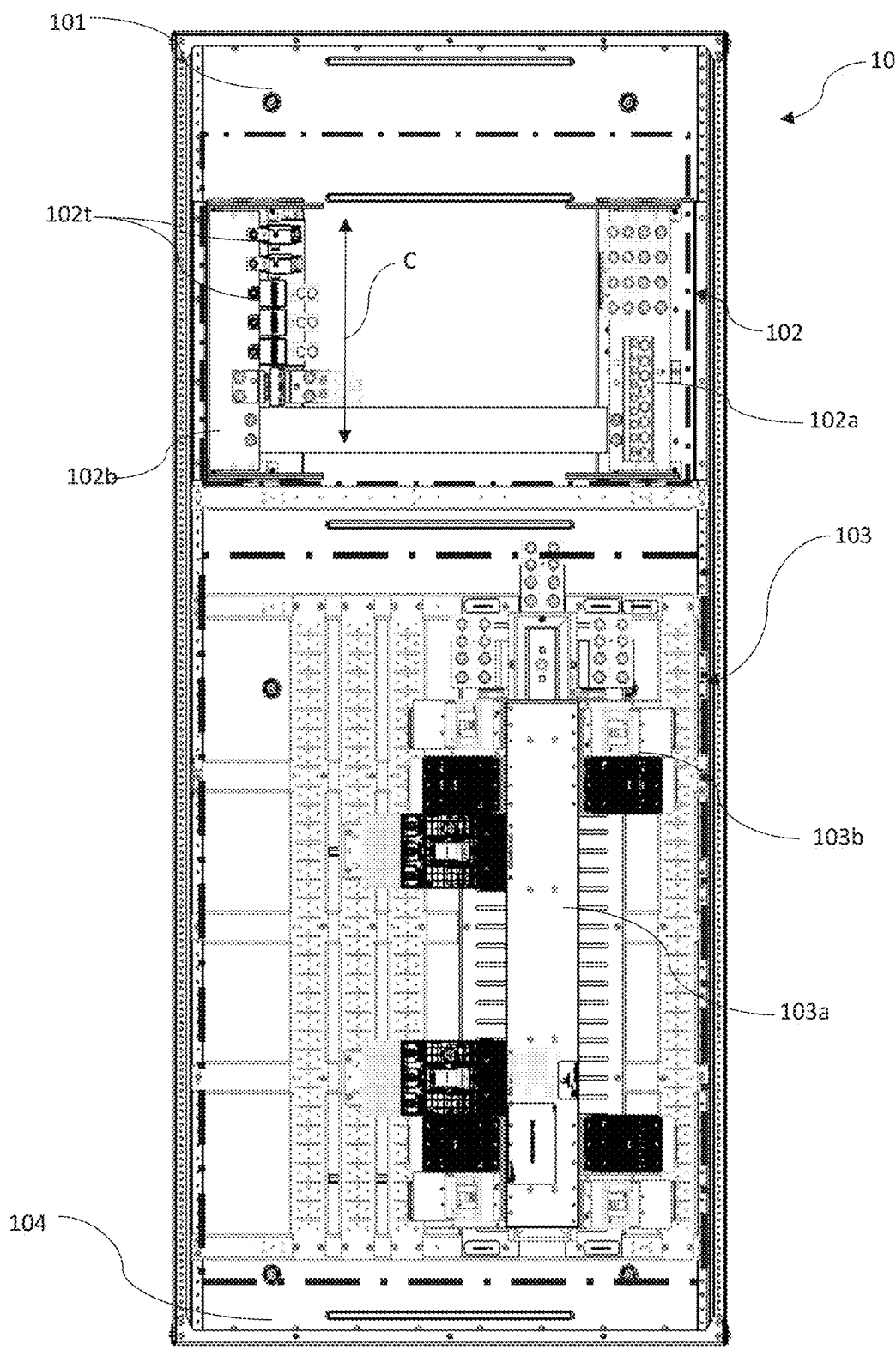
FIG. 2 illustrates a front view of the electrical panel board of FIG. 1.

Referring to FIGS. 1 and 2 in conjunction, there is disclosed an exemplary embodiment of an electrical distribution panel, such as a load center. The electrical distribution panel includes a plurality of circuit breakers 103b for providing a safe and controllable distribution of electric power. Such load centers have become essential in both residential and commercial applications. These power distribution panels are commonly referred to as electrical switchgears or electrical panel boards. The electrical panel board in the corresponding figures is depicted by referral numeral "100" [refer FIG. 1]. The electrical panel board 100 may hereinafter be referred as panel board and may be used interchangeably. The electric panel board 100 of the present disclosure may be adapted as a load center in residential and/or commercial establishments including industrial, healthcare centers or educational institutes. The electrical panel board 100 may be used for at least one of low voltage distribution, medium voltage distribution and/or high voltage distribution. The panel board 100 may include a plurality of switch panels. The switch panels may be configured to as feed-in panels by means of which electrical power may be fed into the switchgear, or they can be distribution panels by means of which the fed-in electrical power is distributed to the components. The switch panels may be electrically connected via conductive members such as bus bars 103a. In dependence on their use, different electrical components are installed in the panel board for example circuit breakers, disconnecting/grounding members and the like.

In an embodiment, the panel board 100 may include an enclosure E. In an embodiment, the enclosure E is defined by a rear wall R [shown in FIG. 1] and a side wall structure S [shown in FIG. 1] projecting perpendicular to and forwardly from a periphery of the rear wall (R) defining a cabinet. The cabinet of the enclosure E may define a first chamber 101 and a second chamber 104. The first chamber 101 and the second chamber 104 may be defined one below the other [in the vertical configuration of the enclosure]. In an embodiment, the first chamber 101 and the second chamber 104 may be defined adjacent to each other in the horizontal configuration of the enclosure E. The rear wall R and along with the side wall structure S defines a front opening. Through the front opening an interior of the enclosure E may be accessible. Further, the enclosure E may include a door [not shown] structured to enclose/cover the entire front opening. The door may be arranged to span the front opening of the enclosure E. In an embodiment, the door is configured to act as a cover of the enclosure E and may be selectively opened or closed to access electrical components of the electrical panel board 100.

The electrical panel board 100 as described above may be adapted to support a power distribution module 103. In an embodiment, the power distribution module 103 may be disposed in one of the first chamber 101 and the second chamber 104. In an exemplary embodiment, the power distribution module 103 may be disposed in the first chamber 101. The power distribution module 103 may be secured to the rear wall R of the enclosure E and extends forwardly along the direction of extension of the sidewall structure S. The power distribution module 103 may be adapted to electrically connect a main power source to receive power thereof and supply the power to one or more loads. In an embodiment, an insulating member [not shown] may be disposed between the power distribution module 103 and the rear wall R of the enclosure E. The insulating member may be configured to electrically isolate the power distribution module 103 from the enclosure E. The second chamber 104 having the power distribution module 103 may be defined with one or more compartments [not shown]. The one or more compartments defined in the second chamber 104 may include at least one of a bus bar compartment, a cable compartment, and a circuit breaker compartment. In an embodiment, the bus bar compartment may include a plurality of bus bars and/or tie buses 103a. Main power from the power source such as three-phase grounded-neutral transformers may be electrically connected to the plurality of bus bars and/or tie buses 103a. In an embodiment, the main power from the power source may be electrically connected to the plurality of bus bar and/or tie buses 103a through circuit breakers 103b that may be disposed in the circuit breaker compartment. The circuit breakers 103b in closed condition may form a connection between the main power source and the plurality of bus bars 103a. Opening the mains of the circuit breakers 103b may disconnect the main power from the power source form its associated bus bar of the plurality of bus bars 103a. Further, the cable compartment may be configured to receive and route cables from the plurality of bus bars 103a to the load.

Figure 4:
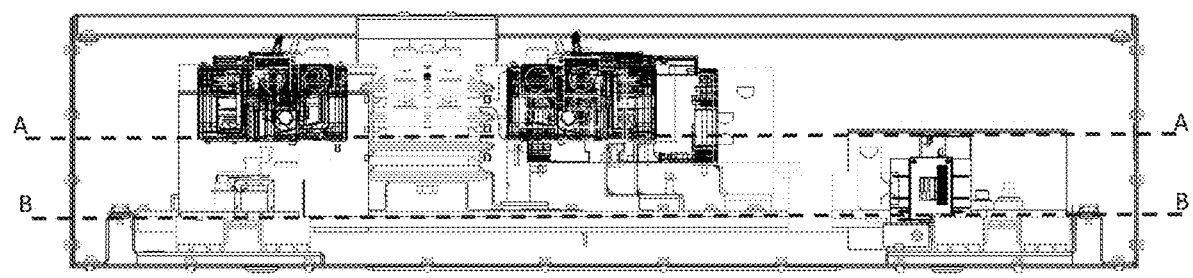
FIG. 4 illustrates a top view of the electrical panel board of FIG. 1.

In an embodiment, the power distribution module 103 may be mounted on a raised surface i.e., mounting surface of the power distribution module 103 may extend from the rear wall R up-to an imaginary plane A-A [refer FIG. 4] and the components of the power distribution module 103 may be secured to the mounting surface along the imaginary plane A-A.

Figure 3A:
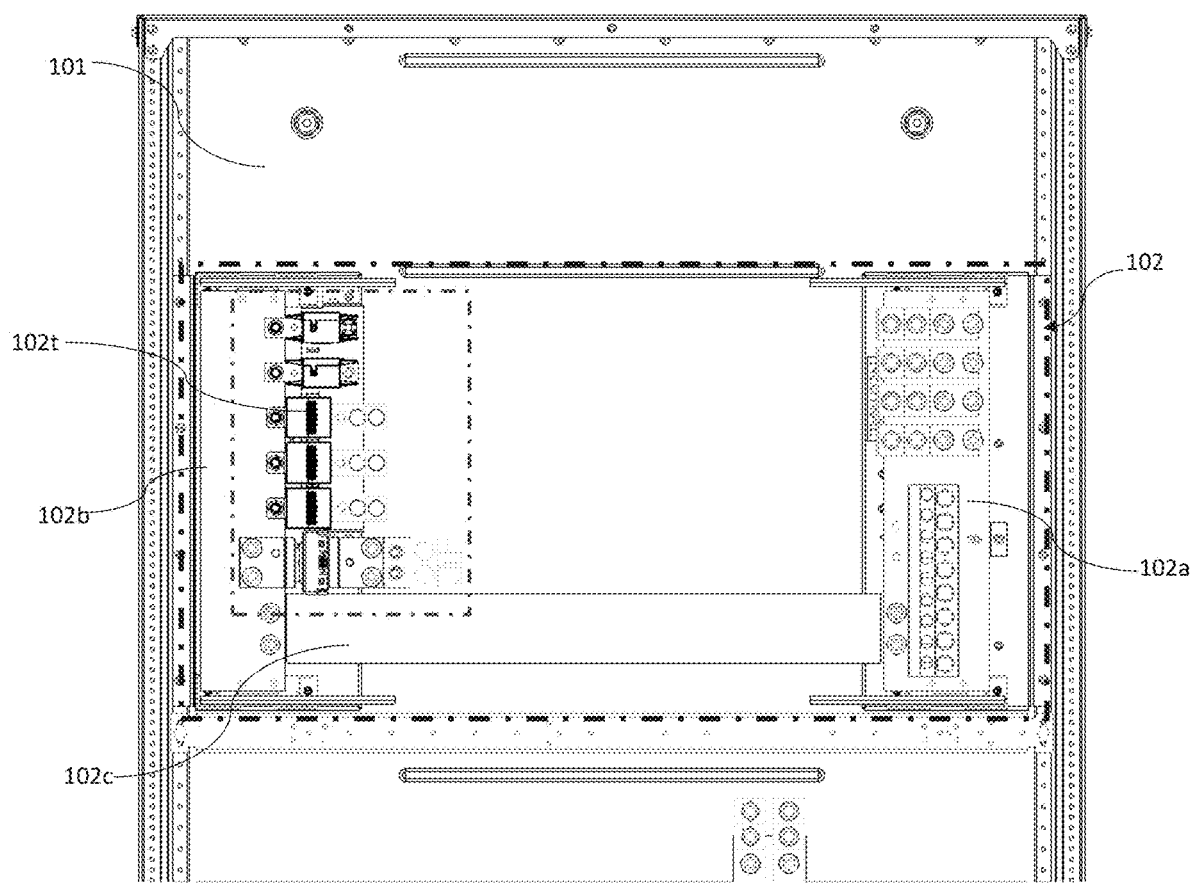
FIG. 3a and FIG. 3b illustrate a portion of the electrical panel board of FIG. 1 depicting neutral assembly, in accordance with some embodiments of the present disclosure.
Figure 3B:
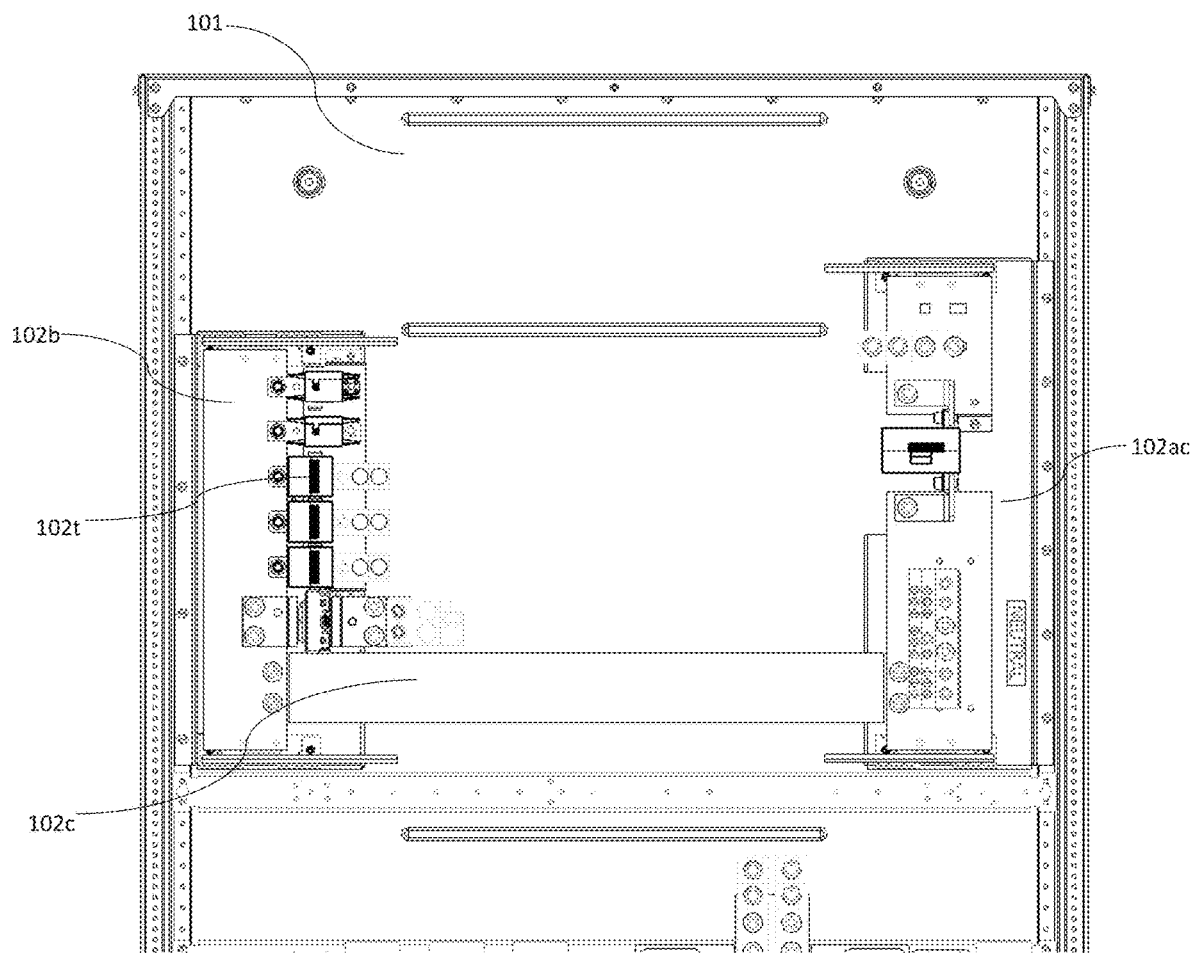

Further, the panel board 100 includes a neutral assembly 102 positioned in the remaining of the first chamber 101 and the second chamber 104. According to the present disclosure, the neutral assembly 102 may be positioned in the second chamber 104. Here, the arrangement of the neutral assembly 102 and the power distribution module 103 should not be construed as a limitation of the present disclosure, the position of the neutral assembly 102 and the power distribution module 103 may be interchangeable between the first chamber 101 and the second chamber 104. FIG. 3a and FIG. 3b illustrate the neutral assembly 102 for the electrical panel board 100 of the present disclosure. Forthcoming paragraphs elucidate the components of the neutral assembly 102 in conjunction to FIGS. 3a and 3b.

Referring to FIG. 3a and FIG. 3b which illustrate the neutral assembly 102 according to the present disclosure. The neutral assembly 102 includes a neutral circuit 102a and a ground fault protection unit 102b as shown in FIG. 3a. In an embodiment, the neutral assembly 102 may also include a neutral circuit which includes at least one ground fault protection unit integrated to the neutral circuit and is depicted with referral numeral 102ac in FIG. 3b. The neutral circuit 102a may include a plurality of neutral input lugs [not shown] arranged for connection of a neutral line with some of the one or more loads and/or the main power source. Generally, the main power source may include the main power line, the neutral line and a ground line. The neutral line from the main power source may be connected to the neutral input lug in the neutral circuit 102a. The neutral input lug may be connected to a neutral bus in addition to connection to the neutral line. Further, the ground fault protection unit 102b may be electrically coupled to the neutral circuit 102a. In an embodiment, the ground fault protection unit 102b may be electrically coupled to the neutral circuit 102a by a bridge connector 102c. The bridge connector 102c may be made of an electrically conductive material including but not limiting to copper. In an embodiment, the bridge connector 102c may be covered by the insulation material such as the insulation tape/cover. Forthcoming paragraphs elucidate configuration of the ground fault protection unit 102b in accordance with the present disclosure.

Figure 5:
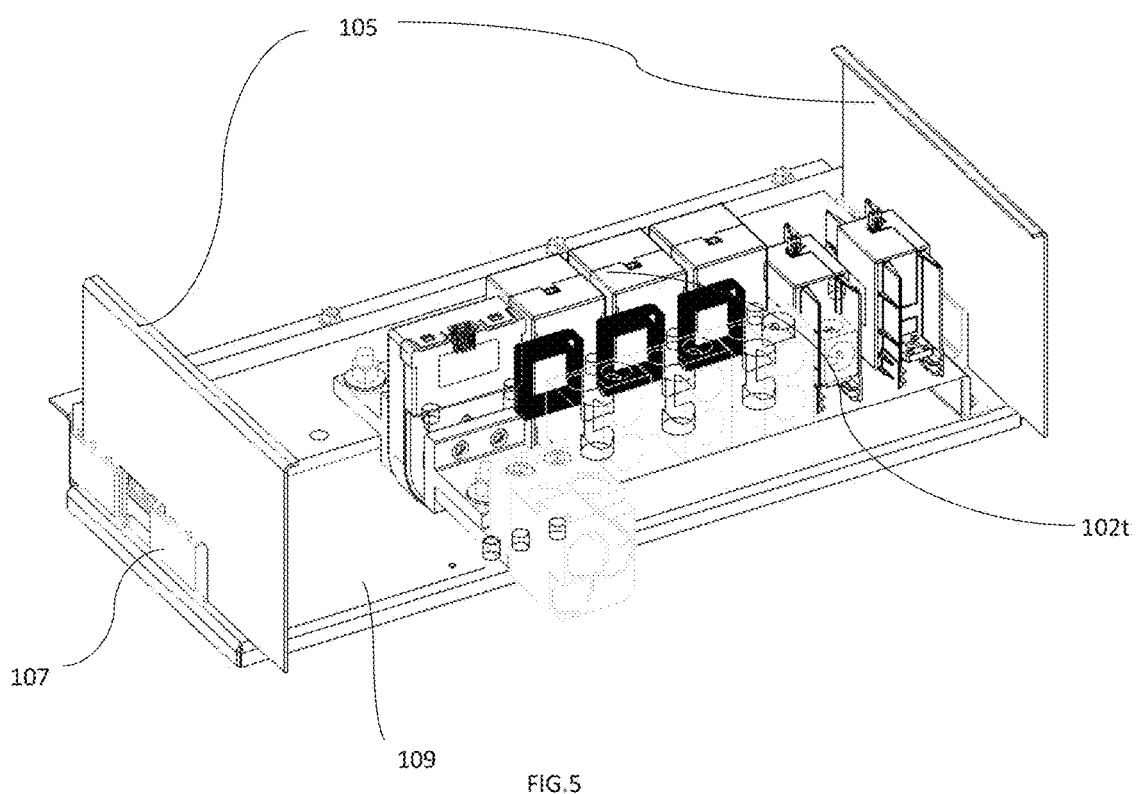
FIG. 5 illustrates an assembled view of the ground fault protection unit, in accordance with embodiments of the disclosure.
Figure 6A:
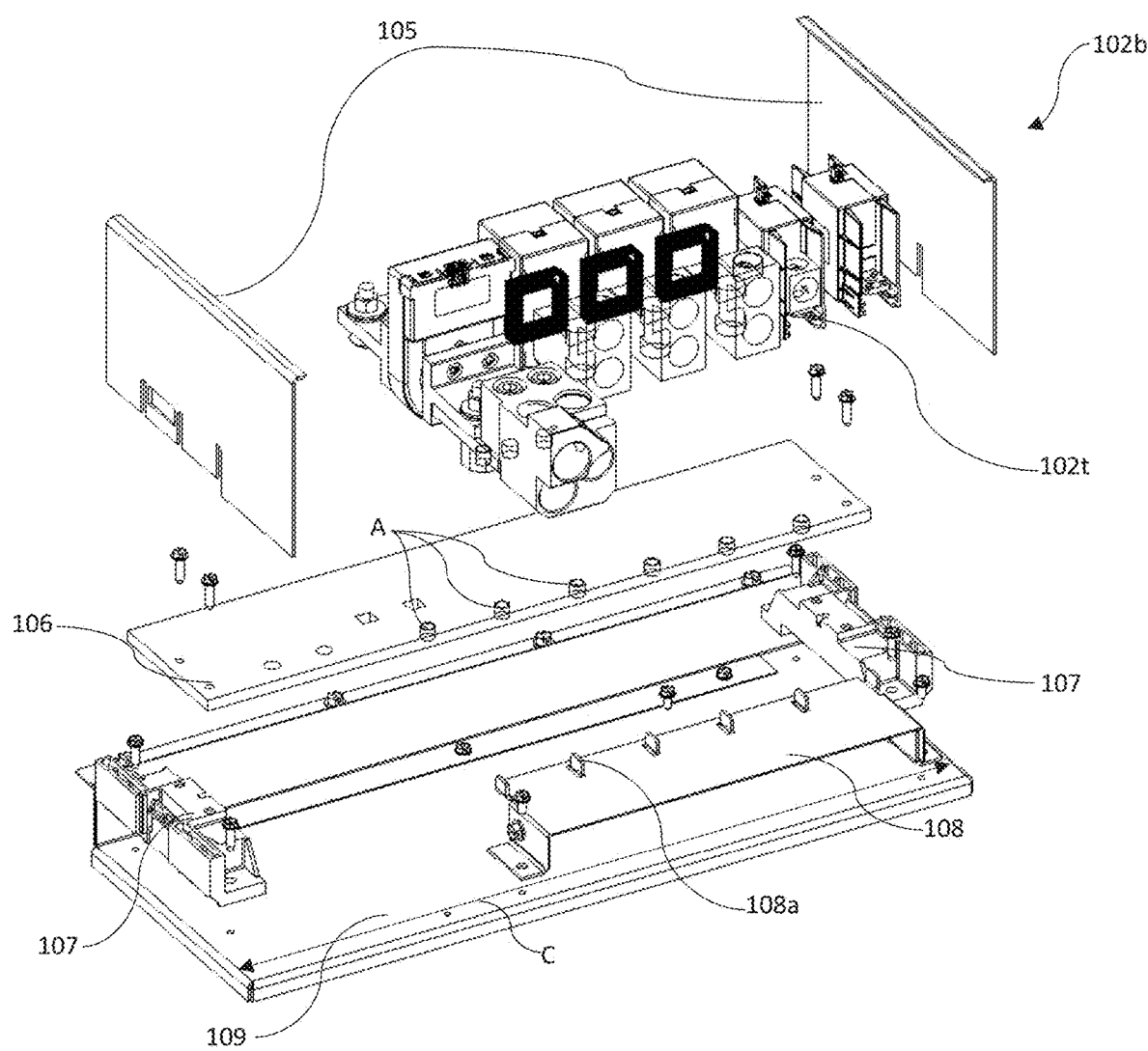
FIGS. 6a and 6b illustrate an exploded front and rear perspective view of a ground fault protection unit of the neutral assembly, in accordance with embodiments of the present disclosure.
Figure 6B:
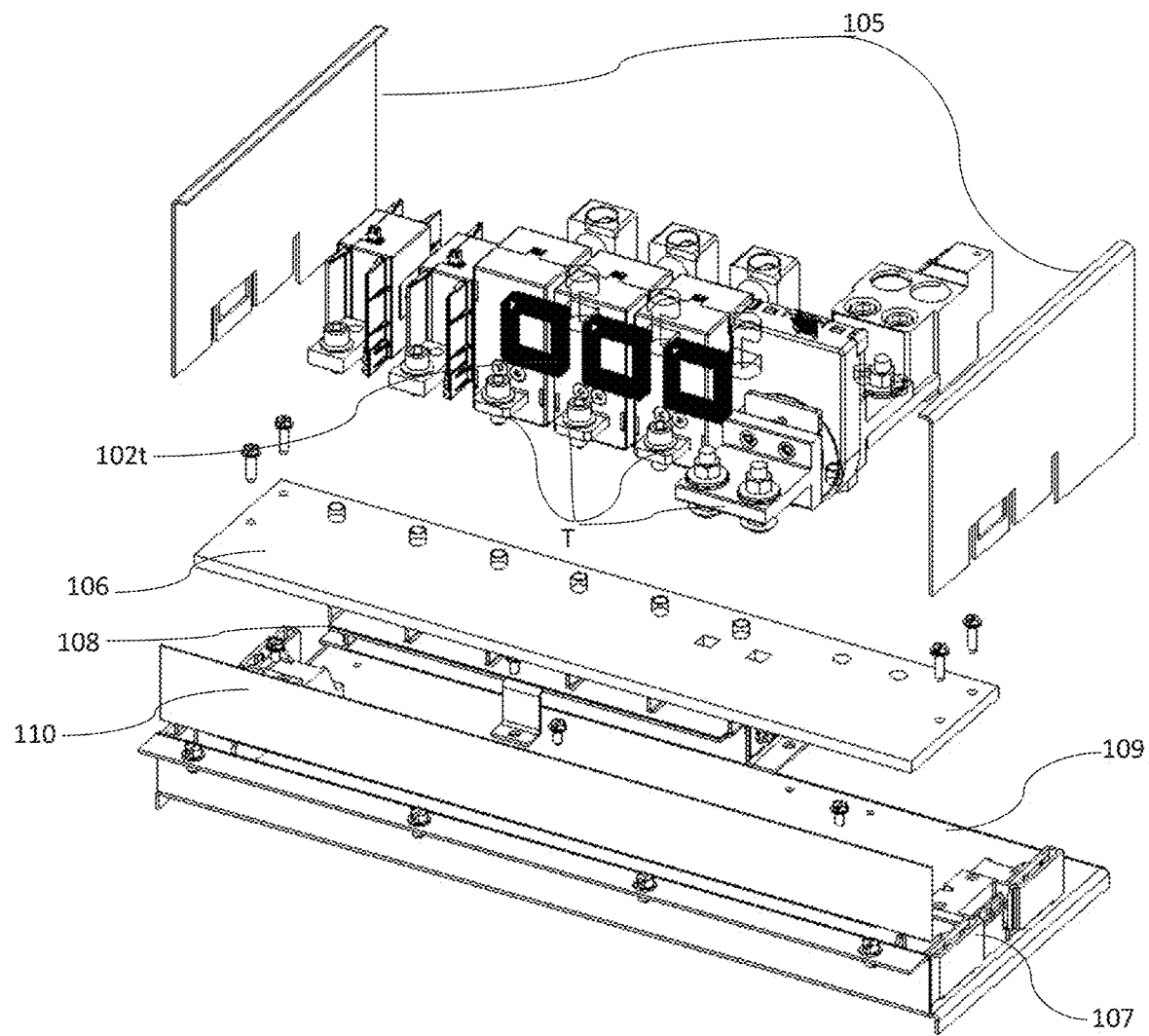

Referring now to FIGS. 5, 6a and 6b illustrate schematic view of the ground fault protection unit 102b depicting various components. In the FIG. 5, the ground fault protection unit 102b in assembled view is shown. Further, FIG. 6a illustrates a front perspective view of the ground fault protection unit 102b. Similarly, FIG. 6b depicts a rear perspective view of the ground fault protection unit 102b. Forthcoming embodiments are elucidated referring to FIGS. 5, 6a and 6b in conjunction. Reference to specific figures will be made in the due course of elucidation for showcasing/depicting specific components of the ground fault protection unit 102b. The ground fault protection unit 102b may be adapted to electrically coupled the neutral circuit 102a with the remaining of the one or more loads.

The ground fault protection unit 102b includes a base plate 109 [refer FIG. 6a] which may be connectable to a portion of the rear wall R in the second chamber 104. The base plate 109 may be secured to the portion of the rear wall R by at least one of mechanical or thermal joining methods such as but not limiting to fastening or welding respectively. In an embodiment, the base plate 109 may be connected to the rear wall R and may extend forwardly from the rear wall R of the enclosure E. The base plate 109 may be an elongated plate extending along the substantial length of the second chamber 104 [depicted by arrow C in FIG. 2]. The ground fault protection unit 102b further includes at least one insulating member 107 [refer FIG. 6a]. The at least one insulating member 107 may be made of electrically insulating materials such as but not limiting to polymeric material including hard plastics. The at least one insulating member 107 configured to isolate the base plate 109 from a connector plate 106 which will be explained in forthcoming embodiments. In an embodiment, the at least one insulating member 107 may be securable to the base plate 109 on either ends as shown in FIG. 6a. Each of the at least one insulating member 107 may extend in a forwardly defining a pre-defined thickness. The pre-defined thickness of the insulating member 107 may ensure sufficient space between the base plate 109 and the connector plate 106, thereby isolating the connector plate 106 from the base plate 109. This ensure that the enclosure E is electrically insulated.

The ground fault protection device 102b includes the connector plate 106 which is adapted to be received by the at least one insulating member 107. In other words, the connector plate 106 may be secured to the base plate 109 through the at least one insulating member 107. In an embodiment, the length of the connector plate 106 may be substantially similar to that of the base plate 109. The connector plate 106 may span up to substantially half of the width of the base plate 109. In some embodiments, the connector plate 106 may be made of conductive materials including but not limiting to copper. Further, a major surface of the connector plate 106 may be defined with a plurality of apertures A [refer FIG. 6a], and such apertures are defined in a portion of the connector plate 106 away from the sidewall structure S. The plurality of apertures A may be defined proximal to the periphery along the length of the connector plate 106. In an embodiment, each of the plurality of apertures A may be equidistantly defined on the connector plate 106. In addition to the above components, the ground fault protection unit 102b may include a supporting bracket 108. The supporting bracket 108 may be positioned adjacent to the connector plate 106. The supporting bracket 108 may be defined with a plurality of tabs 108a [refer FIG. 6a]. Each of the plurality of tabs 108a may be defined corresponding to the position of the plurality of apertures A. The supporting bracket 108 along with the connector plate 106 may be adapted to receive and support one or more current sensors 102t.

The one or more current sensors 102t may be securable to the connector plate 106 and may be supported by the supporting bracket 108. Each of the one or more current sensors 102t may be includes a securing tab T [refer FIG. 6b]. In an embodiment, the securing tab T may be structured to connect the securing tab T to the connector plate 106. The securing tab T may be positioned on the connector plate 106 corresponding to respective aperture of the plurality of apertures A and securable to the connector plate 106 through securing members. The securing members may be fasteners or rivets but not limiting to the same. Once the one or more current sensors 102t are secured to the connector plate 106, the one or more current sensors 102t may be supported over the supporting bracket 108 abutting the corresponding tab of the plurality of tabs 108a. The plurality of tabs 108a may be structured to arrest the movement of corresponding sensor of the one or more current sensors 102t. The assembled view of the ground fault protection unit 102b inclusive of the above-described components may be viewed in FIG. 5. Referring to FIG. 6b, an insulating plate 110 may be disposed between the sidewall structure S of the enclosure E and the ground fault protection unit 102b. In an embodiment, the insulating plate 110 may be provided particularly between the connector plate 106 and the sidewall structure S proximal to the connector plate 106. The insulating plate 110 may be configured to isolate the enclosure E from the ground fault protection unit 102b, thus ensuring that the enclosure E is electrically insulated from the ground fault protection unit 102b.

Once the ground fault protection unit 102b is assembled, the ground fault protection unit 102b may be secured to the rear wall R in the second chamber 104 and may be electrically coupled to the neutral circuit 102a. In another embodiment, a barrier member 105 may be provided between the first chamber 101 and the second chamber 104. The barrier member 105 may be structured to isolate cables spanning from the first chamber 101 to come in contact with the second chamber 104 and vice-versa. In a preferred embodiment, the barrier member 105 may be provided on either ends of the ground fault protection device 102b. The ground fault protection unit 102b and the neutral circuit 102a may define the neutral assembly 102 once coupled through the bridge connector 102c. Referring to FIG. 4 in conjunction with FIGS. 1 and 2, the neutral assembly 102 may extend from the rear wall R to an imaginary plane B-B which is off-set rearwardly from the imaginary plane A-A along with the power distribution module 103. The off-set between the imaginary plate B-B and the imaginary plane A-A defining a gutter space in the enclosure. The gutter space may be used for routing cables spanning from the power distribution module 103 of the first chamber 101.

The ground fault protection unit 102b may be configured to protect the panel board 100 and associated components from ground faults that may occur. For example, if a ground fault occurs in one of the bus bars, it may be necessary to open the associated circuit breaker to isolate fault from rest of the panel board 100 and associated components. In an embodiment, the ground fault tripping function of the circuit breakers may be controlled by trip functions or ground fault relays. Effective energization of these ground fault relays causes the associated circuit breaker to open. For example, if current in excess of a pre-determined level flow through the ground fault relay, corresponding circuit breaker may be tripped or opened. The effective energization of the ground fault relays may be controlled by current flowing through the ground fault protection unit 102. The ground fault protection unit may include ground fault relays and the one or more current sensors 102t. The one or more current sensors 102t may be responsive to sum of current flowing through the primary conductors at the location of the individual sensor. Each of the one or more current sensors 102t may consist current transformers for sensing the current flowing in its associated phase and neutral lugs. The current transformers may develop current signals representative of the current flowing in the power line and the neutral line for separate application to the ground protection unit 102b. The one or more current sensors 102t develop current through their terminals that is substantially proportional to the sum of current flowing through the conductors at the location of the current sensor. As long as the sum of current is zero, the one or more current sensors 102t develops no effective secondary current through its terminals. However, the if the sum of current increases secondary current across the terminals of the one or more sensors 102t may increases, thereby operating the corresponding circuit breaker to open.

In an embodiment, the ground fault protection unit 102b along with the neutral circuit 102a may be provided with in the panel board 100 without need for creating additional space in the panel board 100. Further, the ground fault protection unit 102b is provided in the panelboard 100 without the need to increase the size of the enclosure E or provide extension outside the panel board 100. Further, the modular design of the ground fault protection unit 102b according to the present disclosure provides flexibility for end users to choose from various current sensors are per the requirement. The panel board 100 of the present disclosure is easy to manufacture and assemble, thereby eliminating multiple product configurations. Adding to above advantages, providing the ground fault protection unit 102b within the panel board 100 is a cost-effective solution.

It is to be understood that a person of ordinary skill in the art may develop a system of similar configuration without deviating from the scope of the present disclosure. Such modifications and variations may be made without departing from the scope of the present invention. Therefore, it is intended that the present disclosure covers such modifications and variations provided they come within the ambit of the appended claims and their equivalents.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims e.g., bodies of the appended claims are generally intended as "open" terms e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" e.g., "a" and/or "an" should typically be interpreted to mean "at least one" or "one or more"; the same holds true for the use of definite articles used to introduce claim recitations. In addition, even if a specific number of an introduced claim recitation is explicitly recited, those skilled in the art will recognize that such recitation should typically be interpreted to mean at least the recited number e.g., the bare recitation of "two recitations," without other modifiers, typically means at least two recitations, or two or more recitations. Furthermore, in those instances where a convention analogous to "at least one of A, B, and C, etc." is used, in general such a construction is intended in the sense one having skill in the art would understand the convention e.g., "a system 108 having at least one of A, B, and C" would include but not be limited to systems that have A alone, B alone, C alone, A and B together, A and C together, B and C together, and/or A, B, and C together, etc. In those instances, where a convention analogous to "at least one of A, B, or C, etc." is used, in general such a construction is intended in the sense one having skill in the art would understand the convention e.g., "a system 108 having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Refence number | Description |
| --- | --- |
| 100 | Electrical panel board |
| 101 | First chamber |
| 102 | Neutral assembly |
| 102a/102ac | Neutral circuit |
| 102b | Ground fault protection unit |
| 102c | Bridge connector |
| 102t | Current sensors |
| 103 | Power distribution module |
| 103a | Bus bar |
| 103b | Circuit breaker |
| 104 | Second chamber |
| 105 | Barrier member |
| 106 | Connector plate |
| 107 | Insulating member |
| 108 | Supporting bracket |
| 108a | Tab |
| 109 | Base plate |
| 110 | Insulating plate |
| E | Enclosure |

-continued

| Refence number | Description |
| --- | --- |
| A | Apertures |
| T | Securing Tab |
| R | Rear wall |
| S | Side wall structure |
| A-A | Plane of power distribution module |
| B-B | Plane of neutral assembly |

All references, including publications, patent applications, and patents, cited herein are hereby incorporated by reference to the same extent as if each reference were individually and specifically indicated to be incorporated by reference and were set forth in its entirety herein.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrical panel board, comprising:
    an enclosure comprising a rear wall, a side wall structure projecting perpendicular to and forwardly from a periphery of the rear wall, and defining a front opening through which an interior of the enclosure is accessible, wherein the interior of the enclosure defines a first chamber and a second chamber;
    a power distribution module disposed in one of the first chamber and the second chamber and is securable to the rear wall of the enclosure, the power distribution module is adapted to electrically connect a main power source to receive power thereof and providing the power to two or more loads;
    a neutral assembly positioned in a remaining one of the first chamber and the second chamber and securable to the rear wall of the enclosure, the neutral assembly comprising:
        a neutral circuit comprising a plurality of neutral input lugs arranged for connection of a neutral line of the power to some of the two or more loads; and
        a ground fault protection unit electrically coupled to the neutral circuit, and is adapted to electrically couple the neutral circuit to a remaining some of the two or more loads;
        the ground fault protection unit is electrically coupled to the neutral circuit by a bridge connector;
    wherein, a first imaginary plane defined by the bridge connector of the neutral assembly, and a second imaginary plane defined by a mounting surface of the power distribution module, the first imaginary plane is between the second imaginary plane and the rear wall.

2. The electrical panel board as claimed in claim 1, wherein the power distribution module includes at least one of a bus bar compartment having at least one bus bar, a cable compartment for routing cables and a circuit breaker compartment having a one or more circuit breakers.

3. The electrical panel board as claimed in claim 1, wherein an offset between the first imaginary plane and the second imaginary plane defines a gutter space in the enclosure for routing cables.

4. The electrical panel board as claimed in claim 1, comprises a first barrier member provided between the first chamber and the second chamber, wherein the first barrier member is structured to isolate cables extending within the first chamber from coming in contact with the second chamber.

5. The electrical panel board as claimed in claim 4, wherein the first barrier member and a second barrier member are provided on respective ends of the ground fault protection unit.

6. The electrical panel board as claimed in claim 1, wherein the bridge connector is made of an electrically conductive material.

7. The electrical panel board as claimed in claim 1, wherein the first chamber and second chamber are defined one below the other.

8. The electrical panel board as claimed in claim 1, wherein the ground fault protection unit comprises:
    a base plate connectable to and extending forwardly from the rear wall of the enclosure;
    at least one insulating member securable to the base plate on either ends of the base plate;
    a connector plate secured the base plate through the at least one insulating member, the at least one insulating member between the base plate and the connector plate, wherein the connector plate is defined with a plurality of apertures;
    a supporting bracket positioned adjacent to the connector plate and securable to the base plate; and
    one or more current sensors securable to the connector plate and supported by the supporting bracket.

9. The electrical panel board as claimed in claim 8, wherein the at least one insulating member is configured to isolate the base plate from the connector plate.

10. The electrical panel board as claimed in claim 8, wherein the connector plate is made of an electrically conductive material.

11. The electrical panel board as claimed in claim 8, wherein the plurality of apertures is defined equidistantly on the connector plate.

12. The electrical panel board as claimed in claim 8, wherein the each of the one or more current sensors comprises a securing tab, the securing tab is positioned corresponding to a respective aperture of the plurality of apertures and securable to the connector plate through at least one securing members.

13. The electrical panel board as claimed in claim 8, wherein the supporting bracket is defined with a plurality of tabs and each of the plurality of tabs is structured to arrest a movement of at least one current sensor of the one or more current sensors.

14. The electrical panel board as claimed in claim 1, further comprising an insulating plate disposed between the sidewall structure of the enclosure and the ground fault protection unit, wherein the insulating plate is structured to isolate the enclosure from the ground fault protection unit.

* * * * *